United States Patent
Soufiane et al.

(10) Patent No.: US 7,085,461 B2
(45) Date of Patent: Aug. 1, 2006

(54) OPTICAL FIBER WITH VISUALIZATION FEATURES

(75) Inventors: Abdelouahed Soufiane, Boston, MA (US); William B. Beck, Westborough, MA (US)

(73) Assignee: Verrillon, Inc., North Grafton, MA (US)

( * ) Notice: Subject to any disclaimer, the term of this patent is extended or adjusted under 35 U.S.C. 154(b) by 58 days.

(21) Appl. No.: 10/124,146

(22) Filed: Apr. 17, 2002

(65) Prior Publication Data

US 2002/0172482 A1    Nov. 21, 2002

Related U.S. Application Data

(60) Provisional application No. 60/287,655, filed on Apr. 30, 2001.

(51) Int. Cl.
*G02B 6/02* (2006.01)

(52) U.S. Cl. .................................................... 385/123

(58) Field of Classification Search ......... 385/123–127
See application file for complete search history.

(56) References Cited

U.S. PATENT DOCUMENTS

| | | | | |
|---|---|---|---|---|
| 3,278,283 A | | 10/1966 | Bazinet, Jr. ........................ 65/4 |
| 4,852,968 A | | 8/1989 | Reed ........................ 350/96.33 |
| 4,896,942 A | * | 1/1990 | Onstott et al. ............... 385/127 |
| 4,923,279 A | | 5/1990 | Ainslie et al. ............. 350/96.3 |
| 5,087,108 A | | 2/1992 | Grasso et al. .................. 385/27 |
| 5,259,046 A | | 11/1993 | DiGiovanni et al. .......... 385/12 |
| 5,291,501 A | | 3/1994 | Hanna ............................ 372/6 |
| 5,566,196 A | | 10/1996 | Scifres ............................ 372/6 |
| 5,689,578 A | * | 11/1997 | Yamauchi et al. ........... 385/123 |
| 5,832,163 A | | 11/1998 | Hollister ...................... 385/123 |
| 5,892,876 A | | 4/1999 | Desurvire et al. ........... 385/123 |
| 5,949,941 A | * | 9/1999 | DiGiovanni ................. 385/127 |
| 6,009,222 A | | 12/1999 | Dong et al. .................. 385/127 |
| 6,097,868 A | | 8/2000 | Tardy et al. ................. 385/126 |
| 6,104,852 A | | 8/2000 | Kashyap ...................... 385/123 |
| 6,157,763 A | * | 12/2000 | Grubb et al. ................ 385/126 |
| 6,183,918 B1 | | 2/2001 | Nishiki ......................... 430/22 |
| 6,317,547 B1 | * | 11/2001 | Pavlath ....................... 385/123 |
| 6,347,174 B1 | * | 2/2002 | Onishi et al. ............... 385/122 |
| 6,363,194 B1 | * | 3/2002 | DiGiovanni et al. ........ 385/123 |
| 6,463,195 B1 | * | 10/2002 | Sasaki et al. .................. 385/43 |
| 6,483,973 B1 | * | 11/2002 | Mazzarese et al. ......... 385/123 |
| 6,483,974 B1 | * | 11/2002 | Waarts ........................ 385/123 |
| 6,538,807 B1 | * | 3/2003 | Kakui et al. ............. 359/341.5 |
| 6,587,622 B1 | * | 7/2003 | Maroney et al. .............. 385/41 |
| 6,608,956 B1 | * | 8/2003 | Soufiane ..................... 385/127 |
| 6,813,414 B1 | * | 11/2004 | Xie et al. ..................... 385/31 |

FOREIGN PATENT DOCUMENTS

| | | |
|---|---|---|
| EP | 0 637 762 A1 | 9/1994 |
| JP | 8286066 | 1/1966 |

OTHER PUBLICATIONS

"New Active Fluorescence Glasses", (Mar. 9, 2001), http://www1.sphere.ne.jp/sumita/LUMIIE.HTM, 4 pages.

Patent Cooperation Treaty, International Search Report, International Application No. PCT/US 02/13556, mailed on Jan. 22, 2003, 6 pages.

\* cited by examiner

*Primary Examiner*—Joseph Williams
*Assistant Examiner*—Dalei Dong
(74) *Attorney, Agent, or Firm*—Goodwin Procter, LLP

(57) ABSTRACT

An optical fiber includes a substantially transparent core that carries a light signal, a substantially transparent cladding surrounding the core, and within the cladding and distinct from the core, at least one visualization member facilitating visualization of one or more elements of the fiber structure.

6 Claims, 1 Drawing Sheet

OPTICAL FIBER WITH VISUALIZATION FEATURES

CROSS-REFERENCE TO RELATED APPLICATIONS

This application claims priority to and the benefits of U.S. Provisional Patent Application Ser. No. 60/287,655 filed on Apr. 30, 2001, the entire disclosure of which is herein incorporated by reference.

FIELD OF THE INVENTION

The invention relates to optical fibers and more specifically to their alignment, orientation and/or positioning.

BACKGROUND OF THE INVENTION

Various operations involving optical fibers require fine control over alignment, orientation and/or positioning. Such operations include, for example, splicing of fibers, positioning a fiber with respect a light source, and fiber orientation for purposes of visual examination or automated analysis. Misalignment of fiber cores during splicing, for example, can severely degrade the performance characteristics of the spliced fiber and possibly the system in which it is disposed.

A simple fiber used in many applications is depicted sectionally in FIG. 1. The fiber 100 includes a core 110 surrounded by a cladding 120. Ordinarily, the core 110 and the surrounding cladding 120 are substantially visually transparent. During alignment, light is directed into the core 110 and/or cladding 120. The core 110 has a refractive index differing from that of the cladding 120, and may also include a lasing dopant. In any case, most of the introduced light desirably propagates through the core. When two fibers are properly aligned, light traveling through the core of one fiber will be efficiently transferred into the core of the next fiber.

The yield from this labor-intensive process is low by today's manufacturing standards, and the skill of the operator splicing the fibers plays a role in the overall performance of the spliced fibers. Low yield coupled with the intense manual labor required by the alignment processes easily translates into high cost.

Accordingly, there exists a need for optical fibers capable of convenient and accurate positioning relative to other fibers or to lights sources and other equipment.

SUMMARY OF THE INVENTION

The present invention simplifies fiber handling through the use of visual orientation features facilitating visualization of one or more elements of the fiber structure.

In one aspect, the invention is directed to an optical fiber that facilitates visualization and orientation thereof. The fiber includes a core for interacting with source radiation, a cladding surrounding the core, and within the cladding and distinct from the core, at least one visualization member positioned within a region to be visualized, such that exposing the fiber to pumping radiation causes the visualization member to be visible. The visible feature assists technicians in orienting one or more of the fibers, permitting them to see relative positions with greater clarity.

In one embodiment, the fiber includes at least two visualization members disposed opposite to each other across the core. If desired, the visualization members can be composed of a lasing material. The visualization members have identical or different cross-sectional profiles. Moreover, the visualization members and the cladding can have different coefficients of thermal expansion, thereby creating birefringence in the fiber.

In other embodiments, the visualization member is annular and concentrically surrounds the core. The cladding has a first refractive index and each visualization member has a second refractive index greater than the first refractive index.

In another aspect the invention is directed to a method of orienting an optical fiber. The method includes the steps of providing a fiber having a core for interacting with source radiation, a cladding surrounding the core, and within the cladding and distinct from the core, at least one visualization member positioned within a region to be visualized. The fiber is exposed to pumping radiation, and the visualization member(s) become visible in response.

The visualization member(s) may be visible along the fiber length and/or at the end face.

BRIEF DESCRIPTION OF THE DRAWINGS

The invention is pointed out with particularity in the appended claims. The advantages of the invention may be better understood by referring to the following description taken in conjunction with the accompanying drawing in which:

Figure 1:
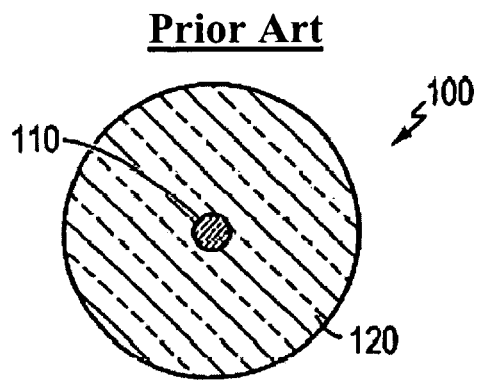
FIG. 1 is a sectional view depicting an embodiment of a traditional optical fiber.

The figures and components illustrated therein are not necessarily drawn to scale. Reference numerals differing in their first digits indicate common subject matter.

DETAILED DESCRIPTION OF THE INVENTION

Figure 2:
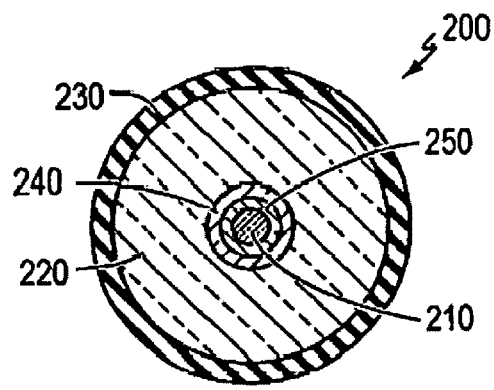
FIG. 2 is a sectional view of an embodiment of an optical fiber incorporating the principles of the present invention and having a visualization region concentric with the core.

With reference to FIG. 2, in one embodiment a fiber 200 includes a core 210, a cladding 220, a coating 230, and a doped region 240. The doped region 240 is disposed within the cladding 220, and may be composed of either a lasing material or a material having a refractive index different from (and typically significantly different from) that of the cladding 220 in order to achieve a visual contrast. In the illustrated embodiment, the core 210 is concentrically surrounded by the doped region 240. The doped region 240 may be adjacent to or spaced radially from the core 210, i.e., an annular region 250 of cladding material can separate the core 210 from the doped region 240. This arrangement enables the core 210 to be easily identified from the end face of the fiber 200, thereby simplifying fiber orientation. When light is pumped into the fiber 200 it interacts with the doped region 240, resulting in visual contrast. The properties of the doped region 240 are desirably chosen such that the doped region 240 appears brighter than or differently colored from the cladding 220, 250, thereby becoming visible against the cladding. This arrangement can be employed in the manner disclosed in co-pending application Ser. No. 09/922,544, entitled "Optical Fiber with Reduced Cladding-Mode Loss" and filed on Aug. 3, 2001, the entire contents of which are herein incorporated by reference. In particular, region 240 can be doped so as to attenuate the power propagating in the cladding 220, thereby reducing cladding-mode coupling loss by decreasing the amount of coupling between the cladding mode power reflected at a Bragg grating interface with the forward propagating core modes.

Figure 3A:
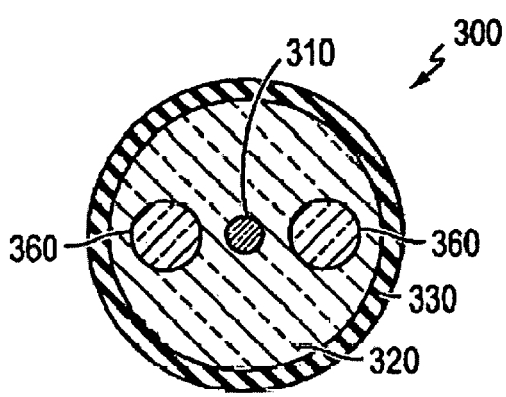
FIGS. 3A and 3B are sectional views of an embodiment of an optical fiber incorporating the principles of the present invention and having visualization members oppositely disposed across the core.
Figure 3B:
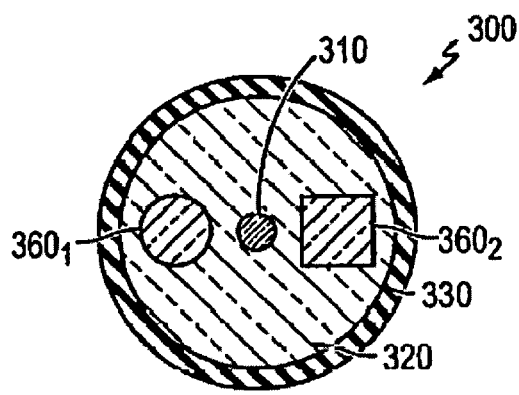

With reference to FIG. 3A, in another embodiment, a plurality of doped regions 360 are disposed within the cladding 320 of an optical fiber 300. The doped regions 360 have substantially similar geometries (i.e., cross-sectional profiles), and may, if desired, be displaced substantially symmetrically about the core 310. In other embodiments, the doped regions $360_1$, $360_2$ have different geometries as exemplified in FIG. 3B. Providing a plurality of doped regions gives an operator multiple alignment points to view for purposes of orientation along multiple axes. Once again, when light is pumped into the fiber 300 it interacts visibly with each doped region 360. The doped regions 360 may appear brighter than, darker than or differently colored from the cladding 320, thereby becoming visible within the fiber structure.

Figure 4:
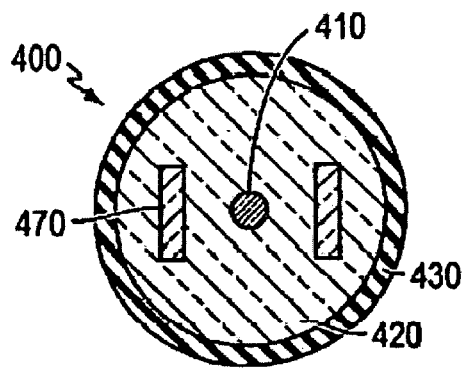
FIG. 4 is a sectional view of an embodiment of an optical fiber incorporating the principles of the present invention and adapted to induce birefringence.

With reference to the optical fiber 400 shown in FIG. 4, a plurality of doped regions 470 may have shapes and/or coefficients of thermal expansion different from that of the cladding 420. In this way, the doped regions 470 induce birefringence within the fiber to preserve the polarization of light travelling through the core, in a manner similar to that disclosed in co-pending application Ser. No. 09/923,320, entitled "Dual-Clad Polarization Preserving Optical Fiber" and filed on Aug. 3, 2001, the entire contents of which are herein incorporated by reference.

The doped regions 240, 360, 470 may contain any of various dopants (e.g., transition metals such as, but not limited to, Co, Cr, Mn, or Ni and/or lasing materials based on Er, Yb, Nd, or Tm) and/or one or more dyes. Again, the purpose of the dopants is to create visible contrast by altering the refractive index, lasing, imparting a color, or otherwise interacting with light in a manner different from the cladding.

A fiber of the present invention may be fabricated from a preform that is itself produced using any of the present methods known in the art such as, but not limited to, modified chemical vapor deposition (MCVD), outside vapor deposition (OVD), vapor axial deposition (VAD), plasma vapor deposition (PVD), a sol-gel process or a melting process. Dopants may be incorporated by methods such as, but not limited to, solution doping, vapor phase doping, and aerosol doping. The doped regions 240, 360, 470 are part of the glass preform that results from the before-mentioned processes.

In another aspect, the invention is directed to a method for orienting a pair of optical fibers. A fiber having a substantially transparent core that interacts with source radiation is provided to an operator. The fiber also includes a substantially transparent cladding which surrounds the core, and at least one visualization member distinct from the core and positioned within the cladding. Exposing the fiber to pump radiation can cause the visualization member to be visible along substantially the entire length of the fiber and/or when viewed from the end face.

Another fiber is provided to the operator and exposed to pump radiation, causing the visualization member to become visible, thereby facilitating fiber positioning, orientation and alignment. In an alternative embodiment, the second fiber is not exposed to pump radiation. Instead, the second fiber is butted to the first and proper alignment is determined by the amount of light that transfers from the visualization member of the first fiber to the visualization member of the second fiber. This may be sensed by a detector receiving light from the end of one of the fibers. Alternatively, light transferred between visualization members can be used to make a course adjustment and energy transferred between fiber cores used as the determinative factor in proper alignment. When proper alignment is achieved, the fibers are spliced by the operator in a conventional fashion.

Having shown the preferred embodiments, one skilled in the art will realize that many variations are possible within the scope and spirit of the claimed invention. It is therefore the intention to limit the invention only by the scope of the claims.

What is claimed is:

1. A method of orienting an optical fiber, the method comprising the steps of:
   a. providing a fiber comprising (i) a unitary core for carrying source radiation, (ii) a cladding surrounding the unitary core, the unitary core and the cladding being substantially transparent, and (iii) within the cladding and spaced apart from the unitary core, at least one visualization member positioned within a region to be visualized, the at least one visualization member comprising at least one of a lasing material, a dye and an index-modifying material;
   b. exposing the fiber to pumping radiation, the at least one visualization member becoming visible in response thereto; and
   c. orienting the fiber based on the at least one visible visualization member.

2. The method of claim 1 wherein the fiber has a length, the visualization member being visible along the fiber length.

3. The method of claim 1 wherein the fiber has an end face, the visualization member being visible at the end face.

4. The method of claim 1 wherein the at least one visualization member comprises a lasing material.

5. The method of claim 1 wherein the at least one visualization member comprises a dye.

6. The method of claim 1 wherein the at least one visualization member comprises an index-modifying material.

* * * * *